(12) United States Patent
Kimura et al.

(10) Patent No.: US 12,122,238 B2
(45) Date of Patent: Oct. 22, 2024

(54) VEHICLE BODY STRUCTURE

(71) Applicant: MAZDA MOTOR CORPORATION, Hiroshima (JP)

(72) Inventors: Takayuki Kimura, Hiroshima (JP); Takehiro Kamei, Hiroshima (JP); Isao Toda, Hiroshima (JP); Haruo Ohe, Hiroshima (JP); Hironobu Hashiguchi, Hiroshima (JP); Hiroshi Tanaka, Hiroshima (JP); Masaya Hiramatsu, Hiroshima (JP); Masanobu Fukushima, Hiroshima (JP); Takao Fukuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 339 days.

(21) Appl. No.: 17/584,872

(22) Filed: Jan. 26, 2022

(65) Prior Publication Data

US 2022/0305915 A1   Sep. 29, 2022

(30) Foreign Application Priority Data

Mar. 29, 2021 (JP) .................................. 2021-055397

(51) Int. Cl.
*B60K 37/00* (2024.01)
*B62D 25/04* (2006.01)

(52) U.S. Cl.
CPC .............. *B60K 37/00* (2013.01); *B62D 25/04* (2013.01)

(58) Field of Classification Search
CPC ........ B60K 37/00; B62D 25/04; B62D 21/15; B62D 25/081; B62D 25/145; B62D 25/08; B62D 25/082; B62D 25/20
See application file for complete search history.

(56) References Cited

U.S. PATENT DOCUMENTS

| | | | | |
|---|---|---|---|---|
| 5,125,715 | A * | 6/1992 | Kijima | B62D 25/082 296/187.09 |
| 9,415,744 | B1 * | 8/2016 | Stojkovic | B60R 21/34 |
| 9,522,703 | B2 * | 12/2016 | Naoi | B62D 25/145 |
| 10,543,873 | B2 * | 1/2020 | Geng | B62D 25/081 |
| 11,383,770 | B2 * | 7/2022 | Ebisumoto | B62D 21/157 |
| 2011/0095568 | A1 | 4/2011 | Terada et al. | |

FOREIGN PATENT DOCUMENTS

| | | | | |
|---|---|---|---|---|
| CN | 102050151 A | | 5/2011 | |
| JP | 2886291 B2 | * | 4/1999 | |
| JP | 2003320961 A | * | 11/2003 | ............... B60K 5/02 |
| JP | 2003341344 A | * | 12/2003 | |
| JP | 2004074909 A | * | 3/2004 | |
| JP | 2011143784 A | * | 7/2011 | |
| KR | 10-2010-0031796 A | | 3/2010 | |

\* cited by examiner

*Primary Examiner* — James A Shriver, II
*Assistant Examiner* — Michael T. Walsh
(74) *Attorney, Agent, or Firm* — Studebaker & Brackett PC (57) ABSTRACT

A bulge portion bulging rearward is provided at a dash panel. A reinforcement is fixed to an inner surface of the bulge portion. A rear end wall portion of the bulge portion is positioned at the rear of a center portion of a rear end portion of a cowl panel in a vehicle width direction.

7 Claims, 10 Drawing Sheets

VEHICLE BODY STRUCTURE

CROSS-REFERENCE TO RELATED APPLICATION

This application claims priority to Japanese Patent Application No. 2021-055397 filed on Mar. 29, 2021, the entire disclosure of which is incorporated by reference herein.

BACKGROUND

The present disclosure relates to a vehicle body structure of a vehicle, and particularly to a technical field of a structure with a dash panel.

An engine room for storing an engine is provided at a front portion of a motor vehicle, and this engine room and a vehicle interior are divided from each other by a dash panel extending in an up-down direction and a vehicle width direction (see, e.g., Japanese Unexamined Patent Publication No. 2004-74909).

At a center portion of the dash panel of Japanese Unexamined Patent Publication No. 2004-74909 in the vehicle width direction, a bulge portion bulging inward of the vehicle interior (rearward of the vehicle) is formed. An air conditioning unit is arranged at the rear of the bulge portion, and a crash space is provided between the bulge portion and the air conditioning unit. In the crash space, a load absorbing member is arranged, which absorbs a load in a front-rear direction upon forward collision. The load absorbing member has a deformation member and a base plate extending in the up-down direction. An upper end portion of the base plate is joined to a cowl panel, and a lower end portion of the base plate is joined to the vicinity of a rearmost end of the bulge portion.

SUMMARY

Upon the forward collision, a rearward load is applied to a power train stored in the engine room. For effectively absorbing an impact load, there is a demand for a sufficient rearward stroke range of the power train.

However, due to the layout and design of the vehicle and its required dynamic performance, there are cases where the entire length of the engine hood of the vehicle needs to be shortened. Shortening the entire length of the engine hood means shortening the dimension of the engine room in the front-rear direction, which is a negative factor in ensuring a rearward stroke range of the power train upon the forward collision.

In this regard, Japanese Unexamined Patent Publication No. 2004-74909 describes that the crash space is provided between the bulge portion and the air conditioning unit. However, a rear end wall portion of the bulge portion is positioned in the vicinity of a front end portion of the cowl panel, and the base plate forming a rear end portion of the load absorbing member is positioned at the front of a rear end portion of the cowl panel. That is, the amount of rearward bulging of the bulge portion is small, and the position of the rear end portion of the load absorbing member is entirely closer to the front. This may result in an insufficient rearward stroke range of the power train, particularly in a case where the entire length of the engine hood needs to be shortened.

In terms of ensuring the rigidity of a front portion of the vehicle body, this is disadvantageous in the case of, e.g., a front-engine rear-drive vehicle because a dimension from a lower end portion of a front window to a front end of the engine hood is long. In particular, if the amount of rear bulging of the bulge portion is increased so as to ensure the rearward stroke range of the power train upon the forward collision, the rigidity of the dash panel is reduced, and the dash panel is easily deformed such that portions of the dash panel on the right and left sides of the bulge portion open due to external force at the time of traveling. Thus, the operation stability and dynamic performance of the vehicle are degraded in some cases.

The above-described problems are not limited to a vehicle having an engine mounted at the front of a vehicle interior. The same also applies to a vehicle having a traction motor mounted at front of a vehicle interior, for example.

The present disclosure has been made in view of the above-described points, and it is an object of the present disclosure to ensure the rigidity of a front portion of a vehicle body during traveling under normal conditions to improve the operation stability and dynamic performance of the vehicle and to ensure a sufficient rearward stroke range of a power train upon forward collision to improve the safety of an occupant.

To achieve the above-described object, a first aspect of the present disclosure may premise a vehicle body structure of a vehicle, which includes a vehicle interior, a dash panel provided at the front of the vehicle interior to divide the vehicle interior and a power house storing a power train from each other in a vehicle front-rear direction, and a cowl panel provided above the dash panel and extending in a vehicle width direction. The dash panel includes a bulge portion bulging from a center portion of the dash panel in the vehicle width direction toward the rear of the vehicle. The dash panel includes a reinforcement fixed to an inner surface of the bulge portion, at a position away forward from a rear end wall portion of the bulge portion at a rear end portion of the vehicle. The rear end wall portion of the bulge portion is positioned at the rear of a rear end portion at a center portion of the cowl panel in the vehicle width direction.

According to this configuration, the rear end wall portion of the bulge portion of the dash panel is positioned at the rear of the rear end portion at the center portion of the cowl panel in the vehicle width direction. This increases the amount of rearward bulging of the bulge portion, and a great amount of rearward movement of the power train upon forward collision can be ensured.

There is a concern that the rigidity of the dash panel is reduced if the amount of bulging of the bulge portion is increased as described above. However, in this configuration, since the reinforcement for reinforcing the dash panel is fixed to the inner surface of the bulge portion and is positioned away forward from the rear end wall portion of the bulge portion, the effect of reinforcing the dash panel is enhanced. Thus, the rigidity of the dash panel is enhanced even if the amount of bulging of the bulge portion is increased for ensuring a great amount of rearward movement of the power train, and the operation stability and dynamic performance of the vehicle are improved.

A second aspect of the present disclosure further includes a pair of right and left hinge pillars arranged so as to extend in an up-down direction at both end portions of the dash panel in the vehicle width direction, and an instrument panel member fixed to at least one of the hinge pillars and extending to at least a center portion in the vehicle width direction. An upper wall portion of the bulge portion is at a position lower than a lower end portion of the instrument panel member.

That is, if the instrument panel member and the upper wall portion of the bulge portion are in such a positional relationship that the instrument panel member and the upper wall portion of the bulge portion overlap each other when viewed in a vehicle front-rear direction, a great amount of rearward bulging of the bulge portion cannot be ensured. This may result in a smaller rearward stroke range of the power train. On the other hand, in the above-described configuration, the upper wall portion of the bulge portion is at the position lower than the lower end portion of the instrument panel member. Thus, a great amount of rearward bulging of the bulge portion can be ensured regardless of the position of the instrument panel member. Accordingly, a great rearward stroke range of the power train can be ensured.

In a third aspect of the present disclosure, the rear end wall portion of the bulge portion is positioned at the rear of a front end portion of the instrument panel member.

That is, since the instrument panel member is a highly-rigid member, the instrument panel member may hinder rearward movement of the power train, depending on the height of the instrument panel member. In this configuration, the rear end wall portion of the bulge portion is positioned at the rear of the front end portion of the instrument panel member. Thus, the amount of rearward bulging of the bulge portion can be increased, and a great rearward stroke range of the power train can be ensured accordingly.

In a fourth aspect of the present disclosure, the reinforcement extends in the vehicle width direction, a left end portion of the reinforcement in the vehicle width direction is fixed to an inner surface of a left wall portion of the bulge portion in the vehicle width direction, and a right end portion of the reinforcement in the vehicle width direction is fixed to an inner surface of a right wall portion of the bulge portion in the vehicle width direction.

According to this configuration, since the reinforcement couples the right and left wall portions of the bulge portion to each other, the rigidity of the dash panel can be further enhanced.

In a fifth aspect of the present disclosure, a fixing portion to be fixed to an inner surface of the bulge portion is provided at the reinforcement, a cutout portion opening forward is formed at the fixing portion, and the fixing portion is fastened and fixed to the bulge portion by a fastening member inserted into the cutout portion.

According to this configuration, the reinforcement is firmly fixed to the bulge portion by a fastening member such as a bolt, a rivet, or a screw inserted into the cutout portion. Thus, the rigidity of the dash panel during traveling under normal conditions can be sufficiently ensured. When the power train moves rearward upon the forward collision, the power train contacts the reinforcement, and pushes the reinforcement rearward. Since the force of such rearward movement of the power train is significantly great, the reinforcement tends to displace rearward relative to the bulge portion. Since the fastening member is positioned in the cutout portion opening forward, the fastening member can make relative movement through such an open portion. Thus, the reinforcement can move rearward relative to the bulge portion without releasing the fastening force of the fastening member. Thus, a great rearward stroke range of the power train can be ensured.

In a sixth aspect of the present disclosure, a deformation inducing portion inducing bending deformation in response to a rearward load is provided at the reinforcement.

According to this configuration, when the power train moves rearward to contact the reinforcement upon the forward collision, if the reinforcement receives the rear load, the deformation inducing portion induces bending deformation of the reinforcement. Thus, the reinforcement less hinders rearward movement of the power train, and a large rearward stroke range of the power train can be ensured.

In a seventh aspect of the present disclosure, the deformation inducing portion includes at least one of a through-hole penetrating the reinforcement or a deformed portion formed by deformation of the reinforcement into a bead shape.

According to this configuration, the reinforcement can be reliably deformed.

In an eighth aspect of the present disclosure, a fracture inducing portion inducing fracture in response to a rearward load is provided at the reinforcement.

According to this configuration, when the power train moves rearward to contact the reinforcement upon the forward collision, if the reinforcement receives the rearward load, the fracture inducing portion induces fracture of the reinforcement. Thus, the reinforcement less hinders rearward movement of the power train, and a large rearward stroke range of the power train can be ensured.

In a ninth aspect of the present disclosure, the fracture inducing portion includes a through-hole penetrating the reinforcement, and therefore, the fracture can be reliably induced.

As described hereinabove, the reinforcement provided at the position away forward from the rear end wall portion of the bulge portion of the dash panel is fixed to the inner surface of the bulge portion. This can ensure the rigidity of the front portion of the vehicle during traveling under normal conditions, and improve the operation stability and dynamic performance of the vehicle. Further, the rear end wall portion of the bulge portion is positioned at the rear of the rear end portion at the center portion of the cowl panel in the vehicle width direction. Thus, a sufficient rearward stroke range of the power train can be ensured upon the forward collision, and therefore, the safety of an occupant can be improved.

DETAILED DESCRIPTION

An embodiment of the present disclosure will be described in detail below with reference to the drawings. Note that the following description of the preferred embodiment is only an example in nature, and is not intended to limit the scope, applications or use of the present disclosure.

Figure 1:
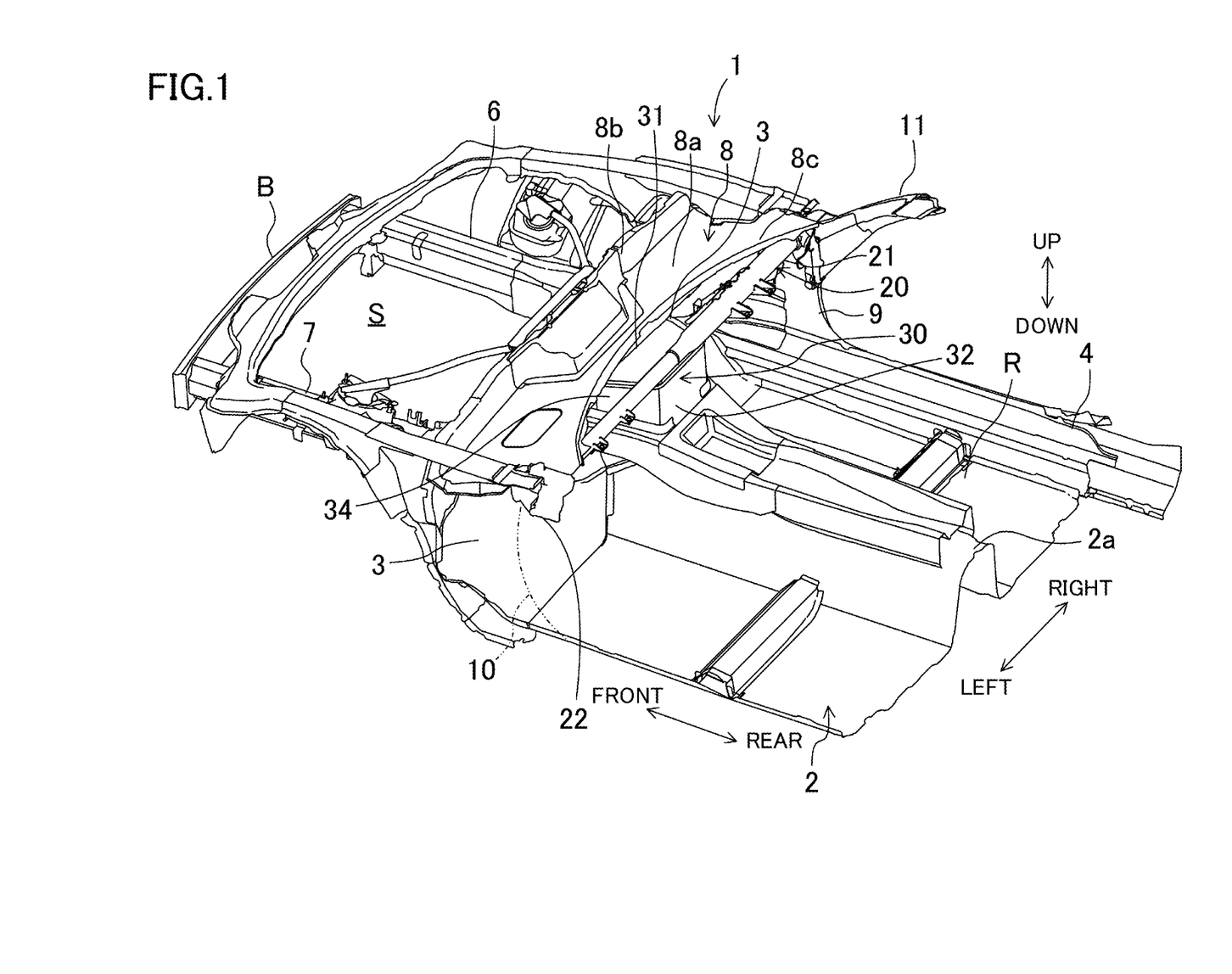
FIG. 1 is a perspective view of a vehicle body structure of an embodiment of the present disclosure from above.
Figure 2:
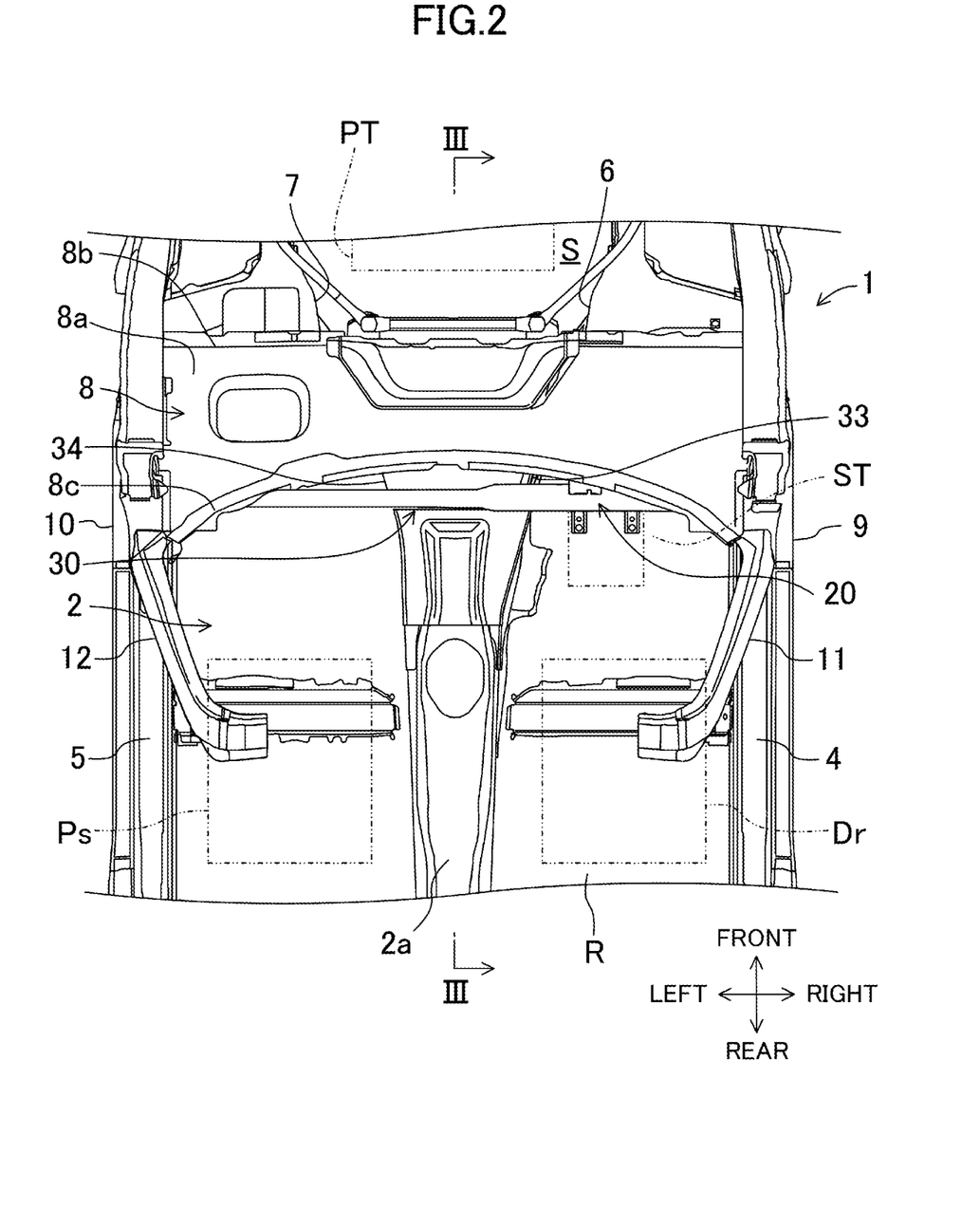
FIG. 2 is a plan view of the vehicle body structure.

FIG. 1 is a perspective view of a vehicle body structure 1 of the embodiment of the present disclosure, and FIG. 2 is a plan view of the vehicle body structure 1. The vehicle body structure 1 is a vehicle body structure applicable to a motor vehicle such as a passenger car. The motor vehicle may be a front-engine rear-drive vehicle (hereinafter referred to as an FR vehicle) configured such that an engine, a traction motor, etc. mounted on a front portion of a vehicle body drive rear wheels, or a front-engine front-drive vehicle (hereinafter referred to as an FF vehicle) configured such that an engine, a traction motor, etc. mounted on a front portion of a vehicle body drive front wheels. In addition to the FR vehicle and FF vehicle, the motor vehicle may also be a 4-wheel drive vehicle configured such that an engine mounted on a front portion of a vehicle body drives four wheels. Note that in the description of this embodiment, the front side of the vehicle is simply referred to as "front," the rear side of the vehicle is simply referred to as "rear," the right side of the vehicle is simply referred to as "right," and the left side of the vehicle is simply referred to as "left." A right-left direction of the vehicle is a vehicle width direction.

The vehicle body structure 1 includes a floor panel 2, a dash panel 3, a right side sill 4, and a left side sill 5 (shown only in FIG. 2). The floor panel 2 is a member forming a bottom plate portion of a vehicle interior, and is formed of, e.g., a steel plate and extends in a front-rear direction. A space above the floor panel 2 is a vehicle interior R. A roof (not shown) is provided above the vehicle interior R. Further, provided at right and left portions of the vehicle interior R, doors (not shown) for getting on and off the vehicle. The right side sill 4 and the left side sill 5 are not necessarily members forming the vehicle body structure 1 of the present disclosure, and may be provided as necessary.

As indicated by virtual lines in FIG. 2, a driver seat Dr is provided on the right side (one side in the vehicle width direction) of the vehicle interior R, and a passenger seat Ps is provided on the left side (the other side in the vehicle width direction) of the vehicle interior R. Conversely, the driver seat Dr may be provided on the left side and the passenger seat Ps may be provided on the right side. In this case, the present embodiment is applicable with the right and left sides being flipped horizontally. Further, at the rear of the driver seat Dr and the passenger seat Ps, a rear seat may or may not be provided. The vehicle interior R may include a luggage room in which luggage etc. are loaded.

The right side sill 4 extends in the front-rear direction along a right edge portion of the floor panel 2. The left side sill 5 extends in the front-rear direction along a left edge portion of the floor panel 2. The vehicle interior R is positioned between the right side sill 4 and the left side sill 5. At a center portion of the floor panel 2 in the right-left direction, a floor tunnel portion 2a is formed so as to bulge upward. The floor tunnel portion 2a continuously extends in the front-rear direction from a front edge portion to a rear edge portion of the floor panel 2.

Figure 3:
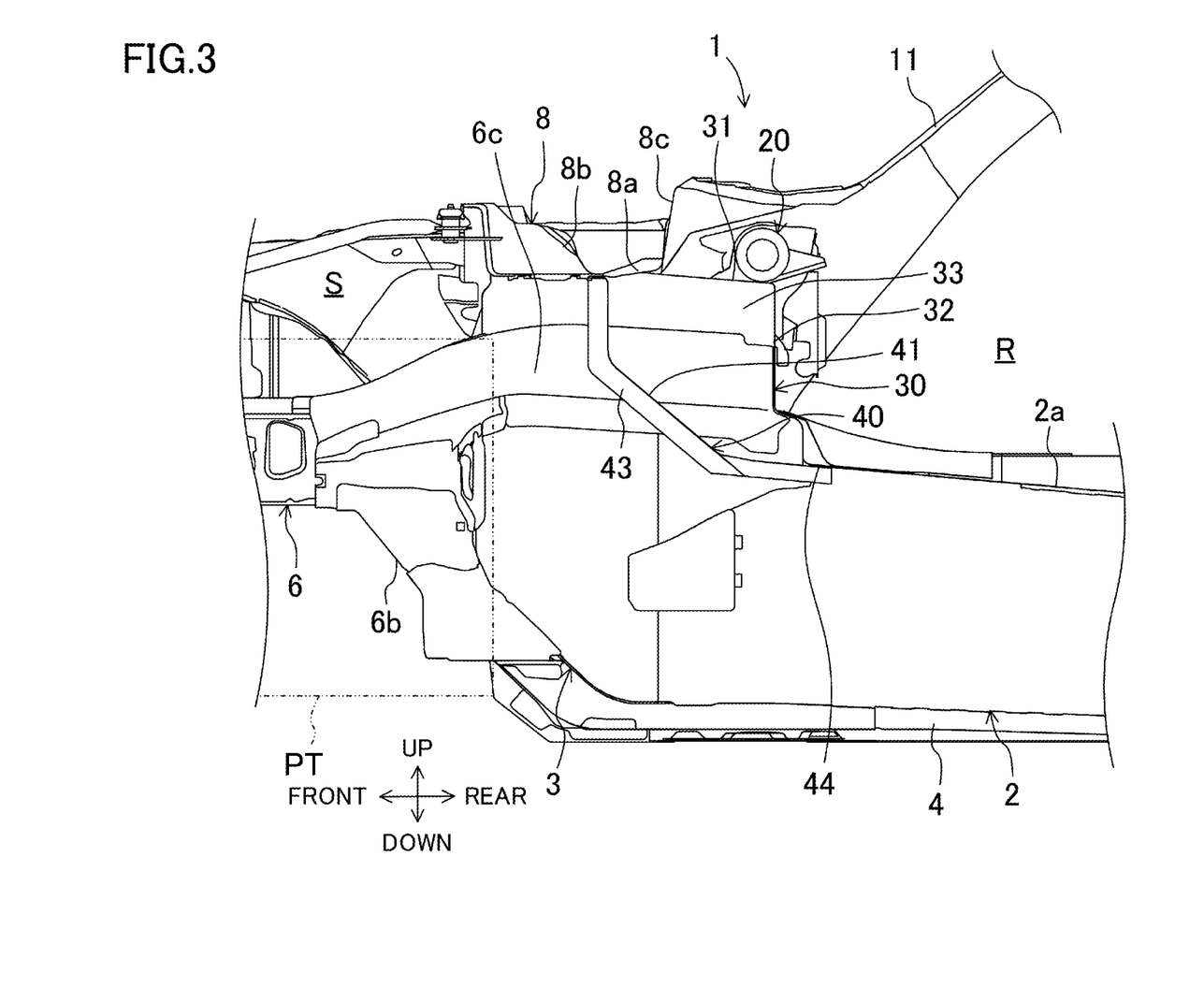
FIG. 3 is a cross-sectional view taken along line in FIG. 2.

At the front of the vehicle interior R, a power house S storing a power train PT (whose schematic shape is shown by a virtual line in FIGS. 2 to 4) is provided. The power house S can also be referred to as, e.g., a power train storage compartment, an engine room, or a motor room. A member dividing the vehicle interior R and the power house S from each other in the front-rear direction is a dash panel 3. The dash panel 3 extends in the right-left direction, and also extends in an up-down direction. As shown in FIG. 3, a lower side portion of the dash panel 3 is inclined or curved so as to be positioned rearward toward a lower end portion thereof, and the lower end portion of the dash panel 3 is connected to a front end portion of the floor panel 2. Thus, the floor panel 2 is provided so as to extend rearward from the lower end portion of the dash panel 3.

The power train PT may be an internal combustion engine or a so-called rotary engine or reciprocating engine, may be a traction motor, or may include both of the engine and the traction motor. In the case of having the traction motor, an engine (part of the power train PT) for electric power generation may be stored in the power house S. In a case where the power train PT is the engine, a crankshaft may be stored in the power house S in such a posture that the crankshaft extends in the front-rear direction, or may be stored in the power house S in such a posture that the crankshaft extends in the right-left direction. The engine may be an in-line multi-cylinder engine in which a plurality of cylinders is arranged in series in an axial direction of a crankshaft, or may be a V-type multi-cylinder engine in which a plurality of cylinders is arrayed so as to form a V-shape when viewed in an axial direction of a crankshaft. Further, the engine may be a horizontally opposed engine in which a plurality of cylinders is arrayed so as to face each other in the horizontal direction with a crankshaft being interposed therebetween.

The power train PT may include a transmission (not shown). The transmission may be an automatic transmission or a CVT transmission in which a gear ratio is automatically changed by a control apparatus mounted on a vehicle, or may be a manual transmission in which an occupant changes a gear ratio by an operation lever (not shown) provided in a vehicle interior R.

Provided above the power house S is a hood (not shown). Further, as shown in FIGS. 1 and 2, a right front side frame 6 is provided at a right portion of the power house S, and a left front side frame 7 is provided at a left portion of the power house S. The right front side frame 6 and the left front side frame 7 both extend in the front-rear direction, and a bumper reinforcement B extending in the right-left direction is attached to front end portions of the right front side frame 6 and the left front side frame 7. The right front side frame 6, the left front side frame 7, and the bumper reinforcement B may be members forming the vehicle body structure 1, or may be members that are not included in the vehicle body structure 1.

Figure 4:
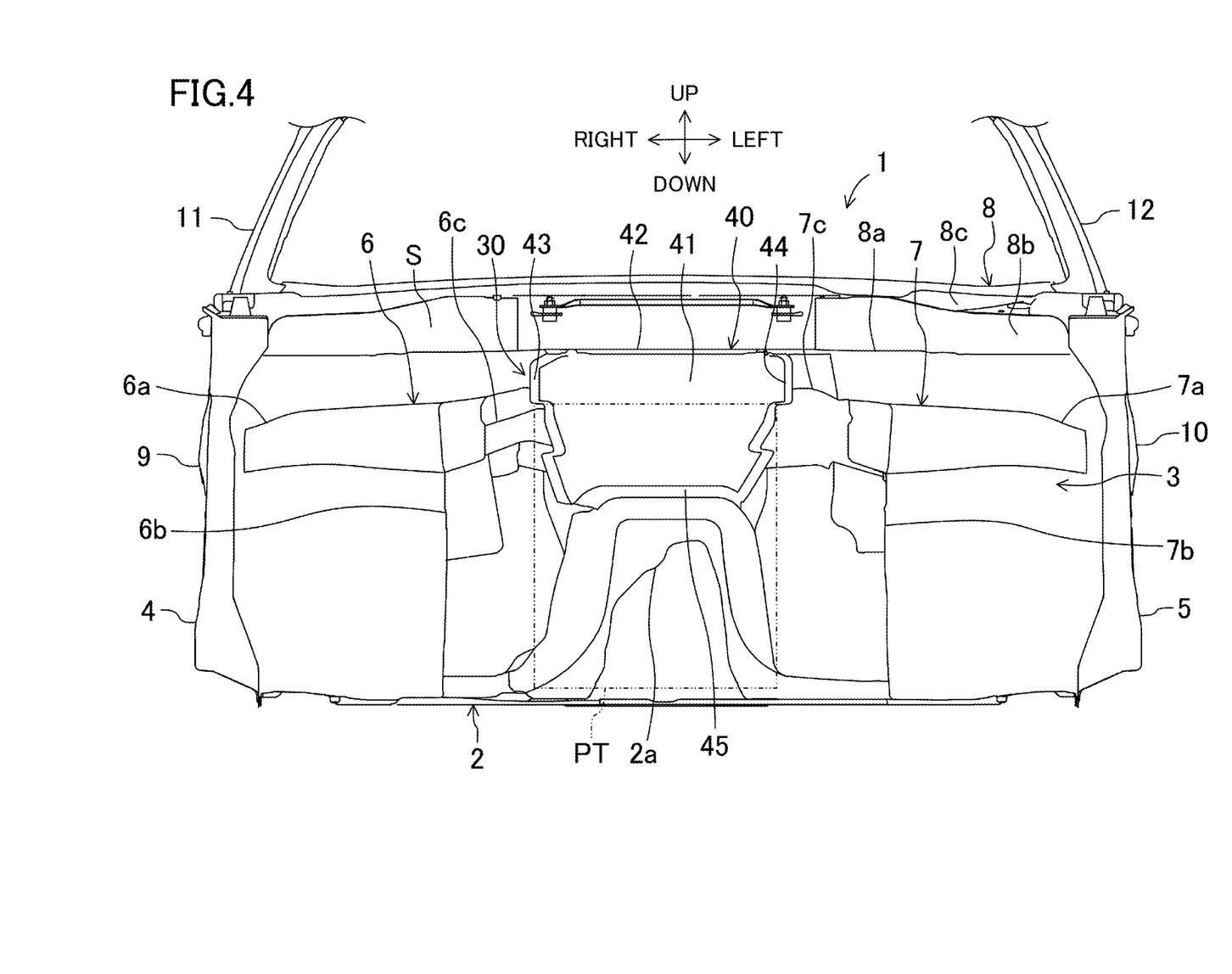
FIG. 4 is a front view of the vehicle body structure.

A rear end portion of the right front side frame 6 is connected to a right portion of the dash panel 3 with respect to a center portion thereof in the right-left direction. As shown in FIG. 4, the rear end portion of the right front side frame 6 branches into three portions, i.e., a horizontal portion 6a extending rightward along the dash panel 3, a lower portion 6b extending downward along the dash panel 3, and a rear portion 6c extending rearward along an inner surface of a later-described bulge portion. Further, a rear end portion of the left front side frame 7 is connected to a left portion of the dash panel 3 with respect to the center portion thereof in the right-left direction. The rear end portion of the left front side frame 7 branches into three portions, i.e., a horizontal portion 7a extending leftward along the dash panel 3, a lower portion 7b extending downward along the dash panel 3, and a rear portion 7c extending rearward along the inner surface of the later-described bulge portion.

As shown in FIG. 3, provided above the dash panel 3 is a cowl panel 8 forming part of the vehicle body structure 1. The cowl panel 8 is formed of a plate material, and extends in the right-left direction. The cowl panel 8 includes a bottom plate portion 8a extending not only in the right-left direction but also in the front-rear direction, a front plate portion 8b extending upward from a front end portion of the bottom plate portion 8*a*, and a rear plate portion 8*c* extending upward from a rear end portion of the bottom plate portion 8*a*. An upper end portion of the dash panel 3 is connected to a front portion of the bottom plate portion 8*a*.

As shown in FIG. 2, the rear end portion of the bottom plate portion 8*a* of the cowl panel 8 is greatly curved in plan view so as to have its center portion in the right-left direction at a frontmost position and be positioned rearward toward the right and left ends. Since the rear plate portion 8*c* extends upward from the rear end portion of the bottom plate portion 8*a*, the rear plate portion 8*c* is also greatly curved in plan view so as to have its center portion in the right-left direction at a frontmost position and be positioned rearward toward the right and left ends. Note that although not shown, a lower end portion of a front window glass is positioned immediately above the rear plate portion 8*c* of the cowl panel 8. Thus, a great portion of the cowl panel 8 is arranged outside the vehicle interior.

As shown in FIG. 4, the vehicle body structure 1 further includes a right hinge pillar 9 arranged so as to extend in the up-down direction at a right end portion of the dash panel 3, and a left hinge pillar 10 arranged so as to extend in the up-down direction at a left end portion of the dash panel 3. That is, as shown in FIG. 1, a lower end portion of the right hinge pillar 9 is connected to the vicinity of a front end portion of the right side sill 4, and the right hinge pillar 9 extends from the vicinity of the front end portion of the right side sill 4 to the vicinity of a position at the substantially same height as that of the cowl panel 8 along the right end portion of the dash panel 3. A hinge that supports a right door arranged at a right portion of the motor vehicle in an openable/closable manner is fixed to the right hinge pillar 9. A lower end portion of a right front pillar 11 is connected to an upper end portion of the right hinge pillar 9. Further, a lower end portion of the left hinge pillar 10 is connected to the vicinity of a front end portion of the left side sill 5, and the left hinge pillar 10 extends from the vicinity of the front end portion of the left side sill 5 to the vicinity of a position at the substantially same height as that of the cowl panel 8 along the left end portion of the dash panel 3. A hinge that supports a left door arranged at a left portion of the motor vehicle in an openable/closable manner is fixed to the left hinge pillar 10. As shown in FIG. 4, a lower end portion of a left front pillar 12 is connected to an upper end portion of the left hinge pillar 10.

(Instrument Panel Member)

As shown in FIGS. 1 and 2, the vehicle body structure 1 includes an instrument panel member 20. The instrument panel member 20 extends in the right-left direction from the upper end portion of the right hinge pillar 9 to the upper end portion of the left hinge pillar 10, and is formed of a hollow tubular member. Although not shown, the instrument panel member 20 is housed inside an instrument panel provided at a front end portion of the vehicle interior R.

A right bracket 21 is fixed to a right end portion of the instrument panel member 20, and is fixed to a vehicle interior side of the upper end portion of the right hinge pillar 9. Further, a left bracket 22 is fixed to a left end portion of the instrument panel member 20, and is fixed to a vehicle interior side of the upper end portion of the left hinge pillar 10. Note that the right bracket 21 and the left bracket 22 may be omitted.

As indicated by virtual lines in FIG. 2, a steering column ST is supported on the instrument panel member 20 on a driver seat Dr side. The steering column ST is a member for rotatably and pivotally supporting a steering shaft (not shown).

Figure 6:
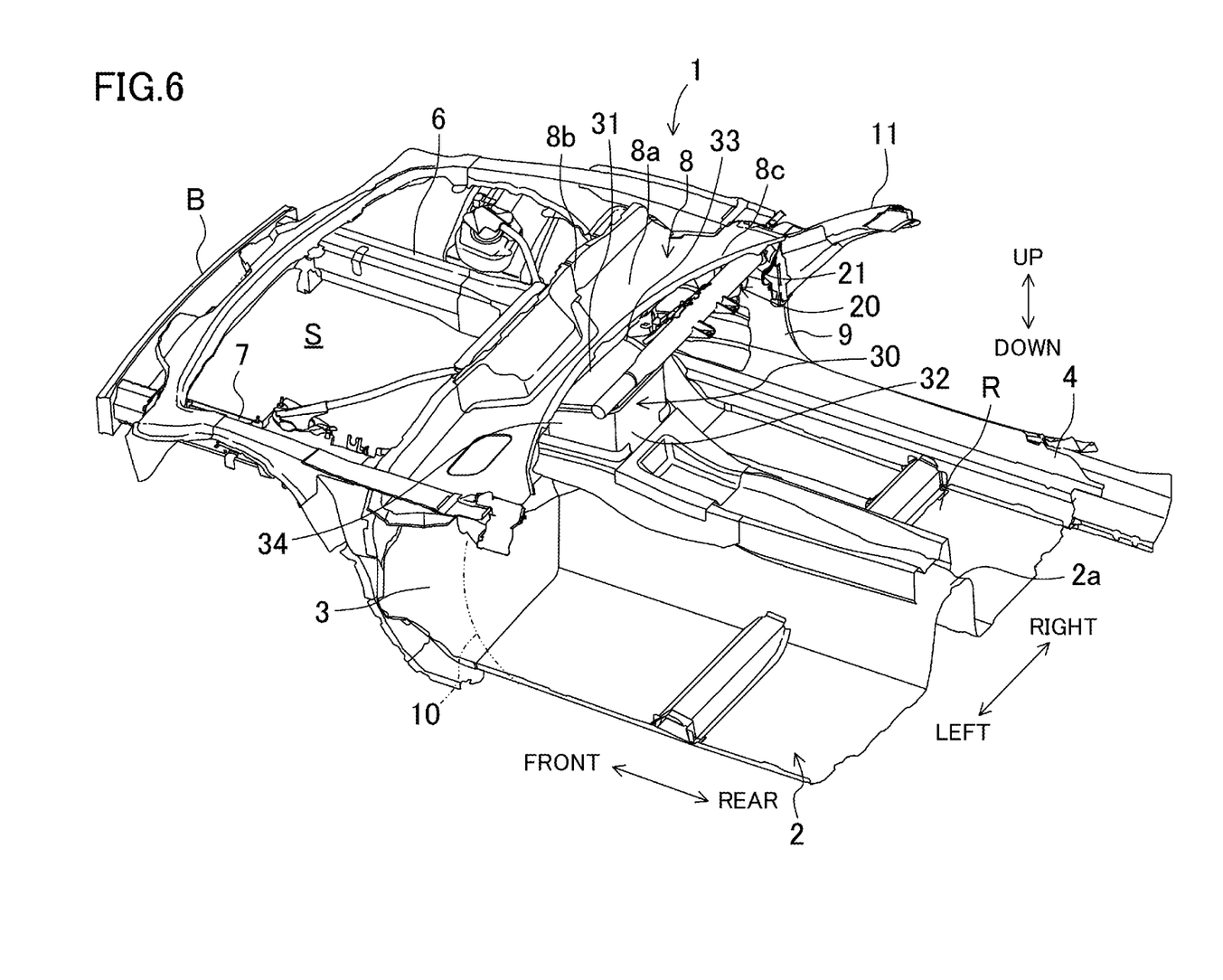
FIG. 6 is a view corresponding to FIG. 1, which shows an example where an instrument panel member is provided only on a driver seat side.

As in another example shown in FIG. 6, the instrument panel member 20 may be a member extending to the center portion in the vehicle width direction. In this example, the right end portion (one end portion) of the instrument panel member 20 is fixed to the vehicle interior side of the upper end portion of the right hinge pillar 9; however, the left end portion (the other end portion) of the instrument panel member 20 does not reach the left hinge pillar 10 and is positioned at the center portion of the vehicle interior R in the vehicle width direction. Further, although not shown, in a case where the driver seat Dr is provided on the left side, the left end portion (one end portion) of the instrument panel member 20 may be fixed to the vehicle interior side of the upper end portion of the left hinge pillar 10, and the right end portion (the other end portion) of the instrument panel member 20 may be positioned at the center portion of the vehicle interior R in the vehicle width direction. That is, it may only be required that the instrument panel member 20 is a member that is fixed to at least one of the right hinge pillar 9 or the left hinge pillar 10 and extends to at least the center portion in the vehicle width direction. The length of the instrument panel member 20 can be set as necessary, and may be longer or shorter than the length shown in FIG. 6.

(Bulge Portion of Dash Panel)

Figure 5:
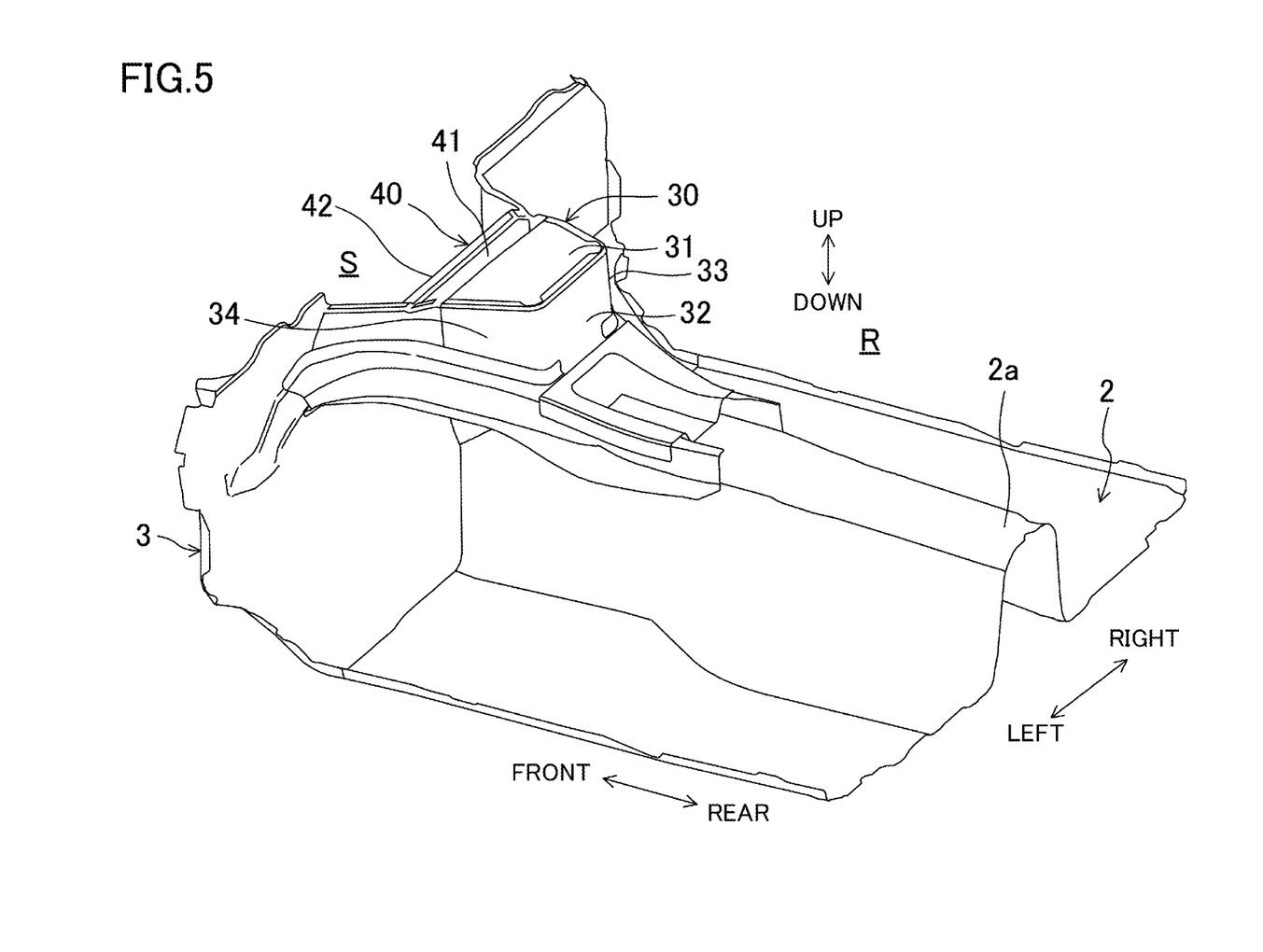
FIG. 5 is a perspective view of a dash panel and a floor panel of the vehicle body structure.

As shown in FIG. 5, the dash panel 3 includes a bulge portion 30 that bulges rearward from the center portion of the dash panel 3 in the right-left direction. The bulge portion 30 includes an upper wall portion 31, a rear end wall portion 32, a right wall portion 33, and a left wall portion 34. The bulge portion 30 is a combination of a plurality of plate members. Specifically, the rear end wall portion 32, the right wall portion 33, and the left wall portion 34 are integrally molded from a single plate member. However, the upper wall portion 31 is formed of a plate member different from the rear end wall portion 32, the right wall portion 33, and the left wall portion 34. The upper wall portion 31 can be integrally joined to upper portions of the rear end wall portion 32, the right wall portion 33, and the left wall portion 34 after molding. The bulge portion 30 may be entirely formed of a single plate member. However, in one preferred embodiment, the bulge portion 30 is molded from a combination of a plurality of plate members, because the bulge portion 30 bulges rearward by a great amount as described later.

The upper wall portion 31 of the bulge portion 30 extends in the front-rear direction and the right-left direction, and is substantially horizontal in this embodiment. However, the upper wall portion 31 may be inclined or curved so as to be positioned lower toward its rear end portion, for example. The rear end wall portion 32 extends downward from a rear end portion of the upper wall portion 31, and extends in the right-left direction. The rear end wall portion 32 is substantially vertical in this embodiment. However, the rear end wall portion 32 may be inclined or curved so as to be positioned rear toward its lower side, for example. The right wall portion 33 extends downward from a right end portion of the upper wall portion 31, and extends in the front-rear direction. The left wall portion 34 extends downward from a left end portion of the upper wall portion 31, and extends in the front-rear direction. A distance in the right-left direction between the right wall portion 33 and the left wall portion 34 may be set so as to be narrowed toward the rear.

A portion of the bulge portion 30 between lower portions of the right wall portion 33 and the left wall portion 34 opens downward. Further, a portion of the bulge portion 30 between front portions of the right wall portion 33 and the left wall portion 34 opens forward. The power train PT having moved rearward upon forward collision is configured to enter the bulge portion 30 from the portion opening forward. Further, since the bulge portion 30 opens downward, even if the dimension of the power train PT in the up-down direction is longer than the dimension of the bulge portion 30 in the up-down direction, an upper portion of the power train PT enters the bulge portion 30 and a lower portion of the power train PT protrudes downward from the bulge portion 30. Thus, the bulge portion 30 does not hinder backward movement of the power train PT.

As shown in FIG. 3, the upper wall portion 31 of the bulge portion 30 is positioned in the vicinity of the upper end portion of the dash panel 3. Therefore, the bulge portion 30 is formed such that a portion of the dash panel 3 from its upper end portion to its middle portion in the up-down direction bulges rearward. As described above, the upper wall portion 31 of the bulge portion 30 is positioned on the upper side, so that when the power train PT moves rearward upon forward collision, the rear upper portion of the power train PT can enter the bulge portion 30 and a great amount of rearward stroke of the power train PT can be ensured accordingly.

Note that "forward collision" in this specification includes not only a case where the motor vehicle collides with an obstacle etc. while traveling forward, but also a case where an obstacle collides, from the front, with the stopped motor vehicle. Further, "forward collision" in this specification is collision that applies, from the front, a great impact load moving the power train PT rearward, and can be distinguished from so-called minor collision.

As shown in FIG. 3, the upper wall portion 31 of the bulge portion 30 is positioned lower than the lower end portion of the instrument panel member 20, and the instrument panel member 20 is arranged immediately above the upper wall portion 31 of the bulge portion 30. The upper wall portion 31 of the bulge portion 30 and the lower end portion of the instrument panel member 20 may be arranged to face each other with a predetermined space therebetween in the up-down direction. Alternatively, the lower end portion of the instrument panel member 20 may be fixed to the upper wall portion 31 of the bulge portion 30. In the latter case, a portion of the instrument panel member 20 far from the right and left hinge pillars 9, 10 is fixed to the bulge portion 30.

In another example shown in FIG. 6, a portion of the instrument panel member 20 far from the right hinge pillar 9 is fixed to the bulge portion 30. Further, in a case where the driver seat Dr is provided on the left side, a portion of the instrument panel member 20 far from the left hinge pillar 10 is fixed to the bulge portion 30.

The dash panel 3 divides the vehicle interior R and the power house S from each other, and therefore, is formed of a high-strength member. Since the bulge portion 30 is formed at the high-strength dash panel 3, the strength of the bulge portion 30 is also increased. Thus, the bulge portion 30 is a portion less-deformable at least as compared to a generally-used typical instrument panel member stay formed long in the up-down direction. Since the instrument panel member 20 is fixed to the bulge portion 30, there is no need for the typical instrument panel member stay. This contributes to vehicle weight reduction, and improves attachment rigidity of the instrument panel member 20 to the vehicle body as compared to a typical fixing structure using the instrument panel member stay. Thus, the amount of deformation of the instrument panel member 20 due to various types of external force applied during traveling is decreased.

As a structure for fixing the instrument panel member 20 to the bulge portion 30, a fastening structure using a fastening member such as a bolt, a nut, a vis screw, a screw, or a rivet can be adopted. In this case, the instrument panel member 20 may be directly fixed to the upper wall portion 31 of the bulge portion 30, or the instrument panel member 20 may be fixed to the upper wall portion 31 with a bracket being interposed therebetween. When the bracket is interposed, there is no need for a long member such as the typical instrument panel member stay, because a distance between the instrument panel member 20 and the upper wall portion 31 is short. Alternatively, the bracket may be welded in advance to one of the instrument panel member 20 or the bulge portion 30, and may be fastened and fixed to the other one of the instrument panel member 20 or the bulge portion 30.

Alternatively, the instrument panel member 20 may be fixed to the rear end wall portion 32 of the bulge portion 30, fixed to the right wall portion 33, or fixed to the left wall portion 34. The instrument panel member 20 may be fixed to one location or plural locations of the bulge portion 30.

As shown in FIG. 1, the rear end wall portion 32 of the bulge portion 30 positioned at a rear end portion of the vehicle is positioned at the rear of the rear end portion at the center portion of the cowl panel 8 in the right-left direction. That is, the rear end portion of the cowl panel 8 forms the rear plate portion 8c. As described above, the rear plate portion 8c is greatly curved in plan view so as to have its center portion in the right-left direction at the frontmost position and be positioned rearward toward the right and left ends. In plan view, the rear end wall portion 32 of the bulge portion 30 is positioned at the rear of the center portion of the rear plate portion 8c in the right-left direction. The position of the rear end wall portion 32 of the bulge portion 30 at the rear of the center portion of the rear plate portion 8c in the right-left direction indicates that, in the vehicle body structure 1 as a whole, the rear end wall portion 32 of the bulge portion 30 is at a position greatly shifted rearward. The greater the amount of bulging of the bulge portion 30, i.e., the longer the dimension of the bulge portion 30 in the front-rear direction, the further rearward the rear end wall portion 32 is positioned. The amount of bulging of the bulge portion 30 can be increased by positioning the rear end wall portion 32 at the rear of the center portion of the rear plate portion 8c in the right-left direction, taking, as a comparison reference, the center portion of the rear plate portion 8c of the cowl panel 8 in the right-left direction as in the present embodiment. Increasing the amount of bulging of the bulge portion 30 can ensure a greater rearward stroke range of the power train PT upon the forward collision as described above.

Note that in this embodiment, in a case where the right and left end portions of the rear plate portion 8c of the cowl panel 8 are taken as a comparison target, the rear end wall portion 32 is positioned at the front of the right and left end portions of the rear plate portion 8c. However, the present disclosure is not limited to above, and the rear end wall portion 32 may be positioned at the rear of the right and left end portions of the rear plate portion 8c.

As shown in FIG. 3, the rear end wall portion 32 of the bulge portion 30 extends not only in the up-down direction but also in the right-left direction, and is positioned at the rear of the front end portion of the instrument panel member 20. Thus, the bulge portion 30 is in a form greatly bulging so as to reach a position below the instrument panel member 20. Here, the front end portion of the instrument panel member 20 can be defined as a front surface portion of the instrument panel member 20. In a case where the instrument panel member 20 has a cylindrical shape, the front end portion of the instrument panel member 20 is a facing-forward foremost portion of an outer circumferential surface of the instrument panel member 20. Although the rear end wall portion 32 of the bulge portion 30 is positioned at the front of the rear end portion of the instrument panel member 20 in this embodiment, the present disclosure is not limited to above and the rear end wall portion 32 of the bulge portion 30 may be positioned at the rear of the rear end portion of the instrument panel member 20. The rear end portion of the instrument panel member 20 can be defined as a rear surface portion of the instrument panel member 20. In a case where the instrument panel member 20 has the cylindrical shape, the rear end portion of the instrument panel member 20 is a facing-rearward rearmost portion of the outer circumferential surface of the instrument panel member 20.

As shown in FIG. 5, a lower portion of the bulge portion 30 is connected to an upper portion of the floor tunnel portion 2a. That is, a lower portion of the rear end wall portion 32 of the bulge portion 30 is integrally connected to an upper wall portion of the floor tunnel portion 2a. Further, the lower portions of the right and left wall portions 33, 34 of the bulge portion 30 are integrally connected to upper portions of the right and left wall portions of the floor tunnel portion 2a.

As described above, the bulge portion 30 is formed across a wide area from the upper end portion to the middle portion in the up-down direction at the dash panel 3, and the rearward bulging amount is increased. Further, the width of the bulge portion 30 is expanded such that the upper portion of the power train PT enters the bulge portion 30 upon the forward collision. Providing such a large bulge portion 30 at the dash panel 3 might reduce the rigidity of the dash panel 3, and might easily deform the dash panel 3 such that portions of the dash panel 3 on the right and left sides of the bulge portion 30 open due to external force at the time of traveling. Thus, the operation stability and dynamic performance of the vehicle are degraded in some cases. Particularly, in terms of ensuring the rigidity of the front portion of the vehicle body, this is disadvantageous in the case of the FR vehicle because a dimension from the lower end portion of the front window to the front end of the engine hood is long. To address this reduced rigidity of the dash panel 3, a reinforcement 40 is provided as shown in FIG. 3 etc. in the present embodiment.

(Structure of Reinforcement)

The dash panel 3 of the present embodiment includes the above-described reinforcement 40, and such a reinforcement 40 is also a member forming part of the vehicle body structure 1. The reinforcement 40 is fixed to an inner surface of the bulge portion 30, at a position away forward from the rear end wall portion 32 of the bulge portion 30. The reinforcement 40 is positioned immediately at the rear of the rear upper portion of the power train PT. That is, the height of the reinforcement 40 and the position of the reinforcement 40 in the right-left direction are set such that the rear upper portion of the power train PT reliably contacts the reinforcement 40 when the power train PT moves rearward upon the forward collision.

Figure 7:
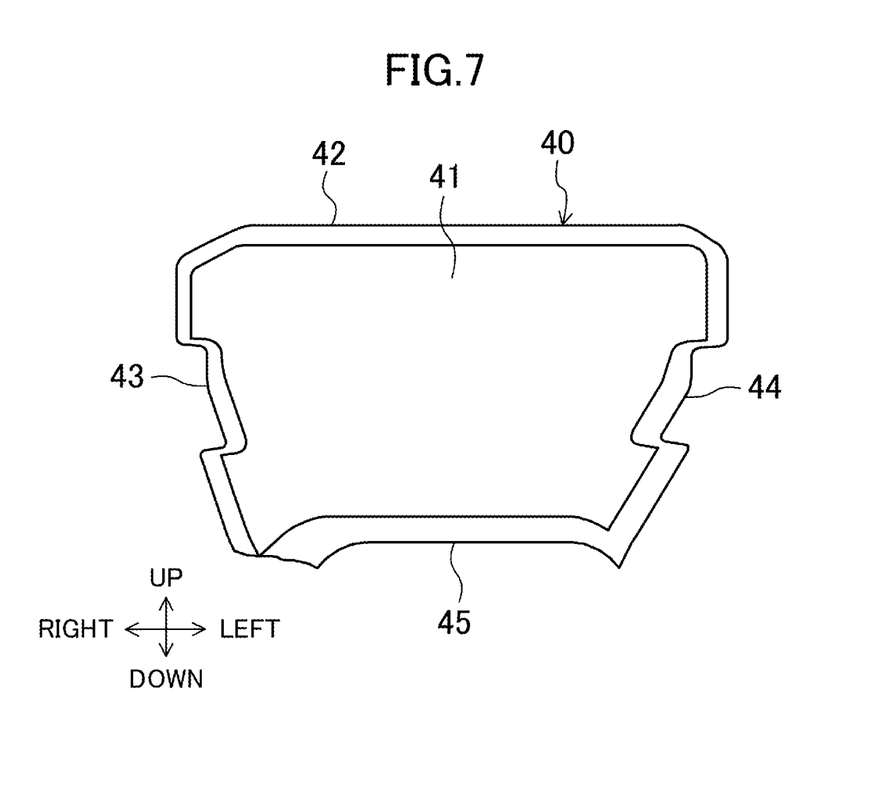
FIG. 7 is a front view of a reinforcement.

As shown in FIG. 7, the reinforcement 40 as a whole has a plate shape extending in the right-left direction and the up-down direction when viewed from the front (the front side). The reinforcement 40 includes a plate-shaped main body portion 41 extending in the right-left direction and the up-down direction, an upper fixing portion 42, a right fixing portion 43, a left fixing portion 44, and a lower fixing portion 45.

The upper fixing portion 42 is provided at an upper end portion of the main body portion 41 so as to protrude forward, and forms a plate shape extending in the right-left direction. For example, the upper fixing portion 42 can be fixed to the bottom plate portion 8a of the cowl panel 8 or to the upper wall portion 31 of the bulge portion 30. Further, the right fixing portion 43 is provided at a right end portion of the main body portion 41 so as to protrude forward, and forms a plate shape extending in the up-down direction. The right fixing portion 43 can be fixed to an inner surface of the right wall portion 33 of the bulge portion 30. Further, the left fixing portion 44 is provided at a left end portion of the main body portion 41 so as to protrude forward, and forms a plate shape extending in the up-down direction. The left fixing portion 44 can be fixed to an inner surface of the left wall portion 34 of the bulge portion 30. Further, the lower fixing portion 45 is provided at a lower end portion of the main body portion 41 so as to protrude rearward, and forms a plate shape extending in the right-left direction. The lower fixing portion 45 can be fixed to the upper wall portion of the floor tunnel portion 2a.

By fixing the right fixing portion 43 and the left fixing portion 44 to the right wall portion 33 and the left wall portion 34 of the bulge portion 30, the right wall portion 33 and the left wall portion 34 are coupled to each other via the reinforcement 40. This improves the rigidity of the dash panel 3. Further, by fixing the upper fixing portion 42 to the bottom plate portion 8a of the cowl panel 8 or the upper wall portion 31 of the bulge portion 30, the rigidity of the bulge portion 30 is improved. As a result, the rigidity of the dash panel 3 is further improved. In addition, by fixing the lower fixing portion 45 to the upper wall portion of the floor tunnel portion 2a, the reinforcement 40 and the floor tunnel portion 2a can be connected to each other, and the rigidity of the dash panel 3 is further improved. Note that either one or both of the upper and lower fixing portions 42, 45 of the reinforcement 40 may be omitted.

For example, as a method of fixing the upper fixing portion 42, the right fixing portion 43, the left fixing portion 44, and the lower fixing portion 45, a fixing method by welding such as spot welding is adoptable. In the case of the fixing method by welding, such a method is set such that while the fixing portions 42 to 45 are not detached from each other due to external force applied during traveling under normal conditions, the fixing portions 42 to 45 are detached from each other due to a rearward load when the power train PT moves rearward to contact the main body portion 41 of the reinforcement 40 upon the forward collision. The fixing force of each of the fixing portions 42 to 45 can be set in advance based on results of a traveling test, a collision test, a simulation, etc. Welding conditions, welding areas, and the number of welding locations may be adjusted so as to achieve the set fixing force.

Figure 8:
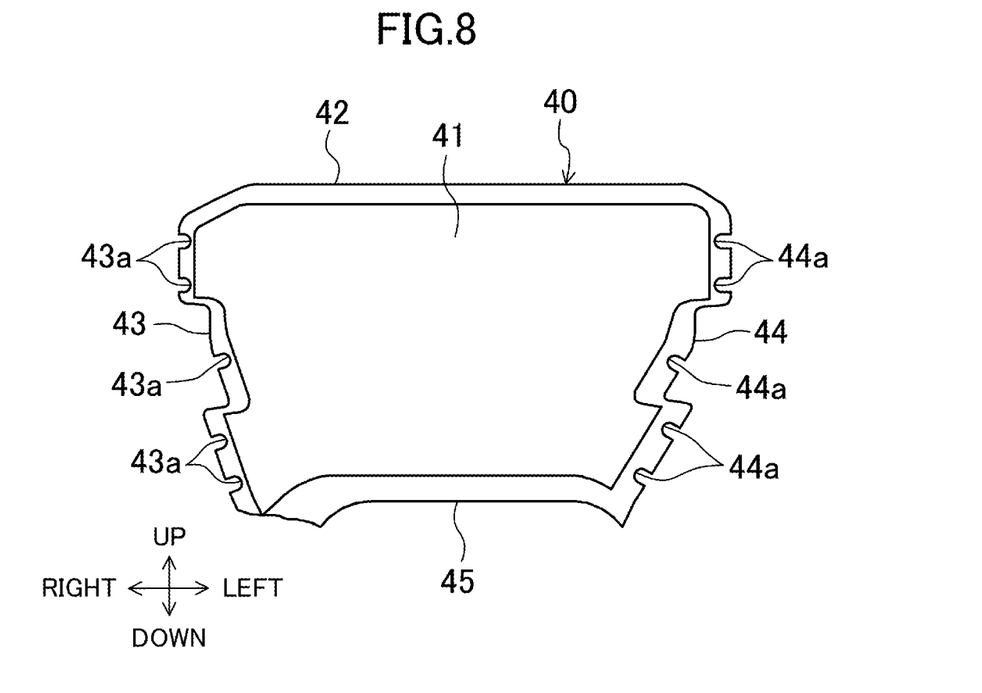
FIG. 8 is a view corresponding to FIG. 7, which shows another example of a fixing structure of the reinforcement.
Figure 9:
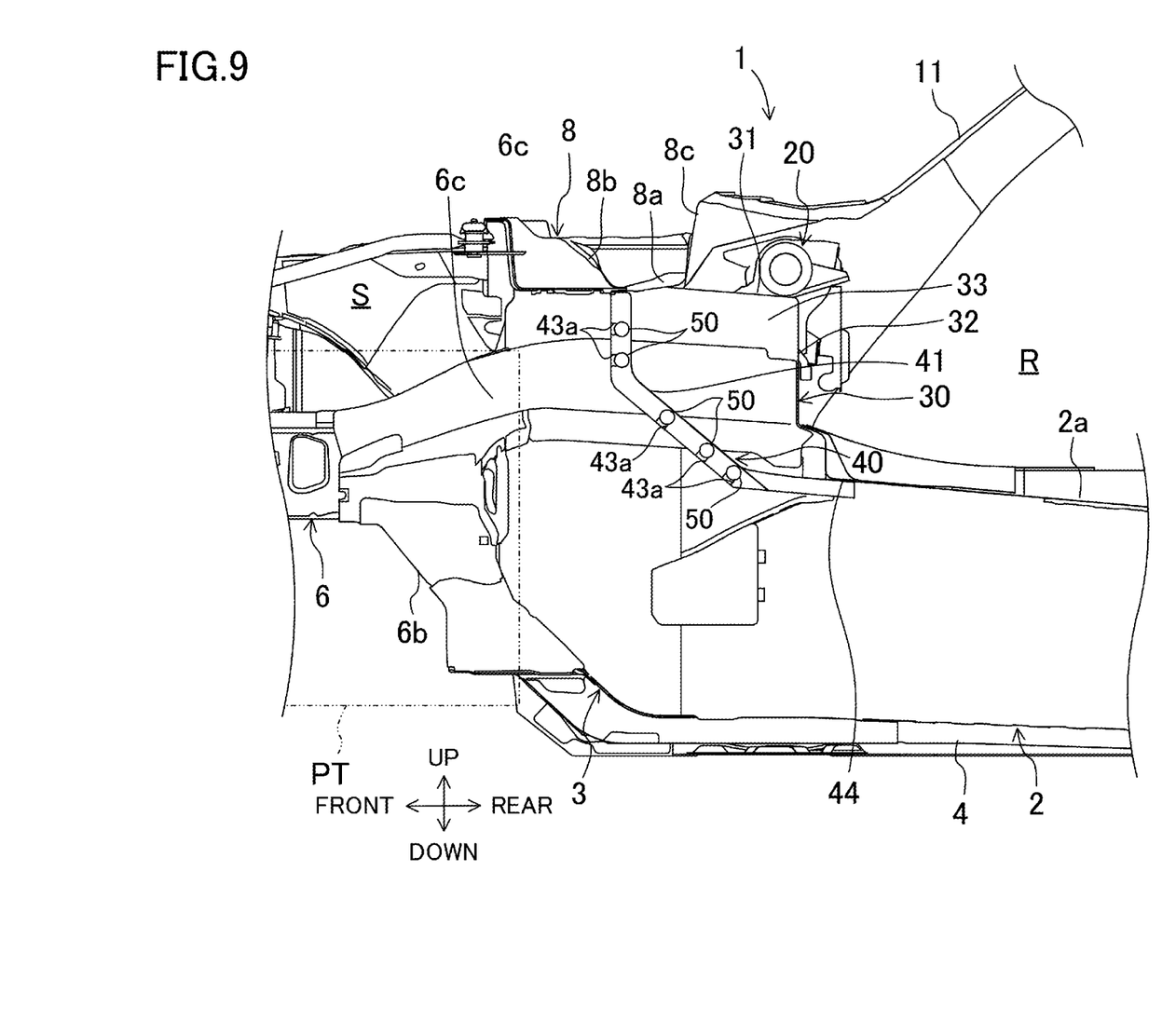
FIG. 9 is a view corresponding to FIG. 3, which shows another example of the fixing structure of the reinforcement.

Further, as in another example shown in FIGS. 8 and 9, the right fixing portion 43 and the left fixing portion 44 may be fastened to the right wall portion 33 and the left wall portion 34 of the bulge portion 30 by means of a fastening member 50. In this example, as shown in FIG. 8, a right cutout portion 43a and a left cutout portion 44a opening forward are each formed at the right fixing portion 43 and the left fixing portion 44. As shown in FIG. 9, the fastening member 50 is inserted into the right cutout portion 43a, and by screwing the fastening member 50 into, e.g., a nut (not shown) fixed to the right wall portion 33, the right fixing portion 43 can be fixed to the right wall portion 33. Alternatively, a not-shown stud bolt (a fastening member) may be provided at the right wall portion 33, and by screwing the stud bold into a nut after the stud bolt has been inserted into the right cutout portion 43a, the right fixing portion 43 can be fixed to the right wall portion 33. The same also applies to the left fixing portion 44. Note that similar cutout portions may be formed at the upper fixing portion 42 and the lower fixing portion 45 and the upper fixing portion 42 and the lower fixing portion 45 may be fastened and fixed by means of a fastening member. One of the right cutout portion 43a or the left cutout portion 44a may be omitted.

In another example shown in FIGS. 8 and 9, the fastening force of the fastening member 50 is set such that while the right fixing portion 43 and the left fixing portion 44 are not detached due to external force applied during traveling under normal conditions, one or both of the right and left fixing portions 43, 44 are detached due to a rearward load when the power train PT moves rearward to contact the main body portion 41 of the reinforcement 40 upon the forward collision. Such fastening force can also be set in advance by the above-described tests and simulation. Fastening torque, the number of fastening locations, the shaft diameter of the fastening member 50, etc. may be adjusted so as to achieve the set fastening force.

In such another example, when the power train PT moves rearward due to the forward collision and pushes the reinforcement 40 rearward, the reinforcement 40 tends to displace rearward relative to the bulge portion 30 because the force of such rearward movement of the power train PT is significantly great. Since the fastening member 50 is positioned in the cutout portions 43a, 44a opening forward, the fastening member 50 can make relative movement through these open portions. Thus, the reinforcement 40 can move rearward relative to the bulge portion 30 without releasing the fastening force of the fastening member 50. Thus, a great rearward stroke range of the power train PT can be ensured.

Figure 10:
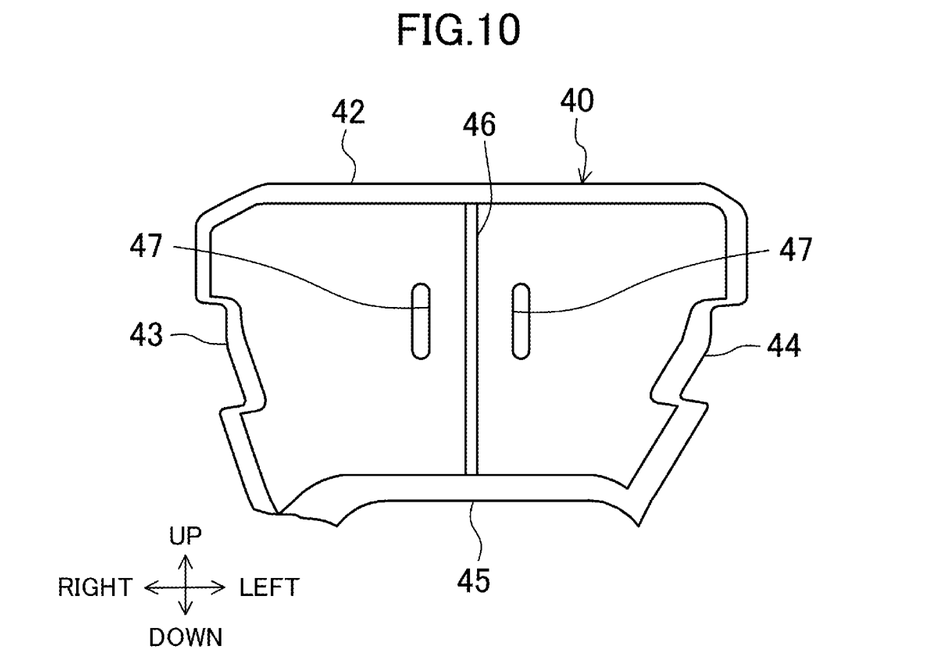
FIG. 10 is a view corresponding to FIG. 7, which shows an example where the reinforcement is provided with a deformation inducing portion.

In the above-described example, a great rearward stroke range of the power train PT can be ensured by detachment of the reinforcement 40 upon rearward movement of the power train PT. However, the present embodiment is not limited to above, and a deformation inducing portion 46 may be provided at the reinforcement 40 as shown in FIG. 10. The deformation inducing portion 46 is a portion inducing bending deformation of the reinforcement 40 when the reinforcement 40 receives a rearward load. A load initiating the bending deformation can be set according to, e.g., the structure of the deformation inducing portion 46 and an area where the deformation inducing portion 46 is provided. In this embodiment, the load is set such that while the reinforcement 40 is little deformed due to external force applied during traveling under normal conditions, the bending deformation occurs due to a rearward load when the power train PT moves rearward to contact the main body portion 41 of the reinforcement 40 upon the forward collision. By the bending deformation of the reinforcement 40, a sufficient rearward stroke range of the power train PT can be ensured.

The deformation inducing portion 46 includes a deformed portion obtained by deformation of the main body portion 41 of the reinforcement 40 into a bead shape. The term "bead shape" refers to a shape in which part of the main body portion 41 bulges in a thickness direction thereof and the deformed portion extends long in a predetermined direction. Such a deformed portion serves as a portion inducing deformation of the main body portion 41. For example, the deformation inducing portion 46 may be a bead-like deformed portion extending in the up-down direction, or may be a bead-like deformed portion extending in the right-left direction or an oblique direction. A plurality of deformation inducing portions 46 may be provided.

Alternatively, a through-hole 47 penetrating the main body portion 41 of the reinforcement 40 may be provided, and may serve as a deformation inducing portion. A portion where the through-hole 47 is formed is relatively weak, and may serve as a portion inducing deformation of the main body portion 41. The through-hole 47 may be in a shape long in the up-down direction, or may be in a circular shape. A plurality of through-holes 47 may be provided. The through-hole 47 and the bead-like deformed portion may be formed at the main body portion 41. The deformation inducing portion may be formed of a thin portion.

A fracture inducing portion inducing fracture in response to a rearward load may be provided at the reinforcement 40. The fracture inducing portion can be formed of, e.g., the through-hole 47 shown in FIG. 10 or a not-shown thin portion. In a case where the main body portion 41 is deformed or fractured, it is not necessary to detach the right fixing portion 43 and the left fixing portion 44 from the right wall portion 33 and the left wall portion 34 of the bulge portion 30, and the reinforcement 40 can be firmly fixed.

(Another Form of Reinforcement)

In the above-described form, the reinforcement 40 has the plate shape extending in the up-down direction and the right-left direction. However, the reinforcement is not limited to above, and although not shown, may have a plate shape, a rod shape, or a shaft shape extending in the right-left direction as long as the reinforcement is a member that can couple the right wall portion 33 and the left wall portion 34 of the bulge portion 30 to each other.

Alternatively, a plurality of reinforcements 40 may be provided. In the case of providing the plurality of reinforcements 40, the reinforcements 40 may be arranged in the up-down direction or the front-rear direction.

FEATURES AND ADVANTAGES OF EMBODIMENT

As described above, according to this embodiment, the reinforcement 40 is fixed to the inner surface of the bulge portion 30, at the position away forward from the rear end wall portion 32 of the bulge portion 30 of the dash panel 3. This can ensure the rigidity of the front portion of the vehicle during traveling under normal conditions, and improve the operation stability and dynamic performance of the vehicle. Further, the rear end wall portion 32 of the bulge portion 30 is positioned at the rear of the center portion of the rear end portion of the cowl panel 8 in the right-left direction. Thus, a sufficient rearward stroke range of the power train PT can be ensured upon the forward collision, and therefore, the safety of the occupant can be improved.

Further, since the instrument panel member 20 is fixed to the bulge portion 30 of the dash panel 3, the support strength of the steering column ST can be increased while reduction in the weight of the vehicle is achieved.

The above-described embodiments are merely examples in nature in all respects, and the scope of the present disclosure should not be interpreted in a limited manner. Further, variations and modifications of equivalents of the patent claims are intended to fall within the scope of the present disclosure.

As described above, the vehicle body structure of the present disclosure is applicable to a vehicle including a dash panel dividing a vehicle interior and a power house from each other.

What is claimed is:

1. A vehicle body structure of a vehicle, comprising:
a vehicle interior;
a dash panel provided at a front of the vehicle interior to divide the vehicle interior and a power house storing a power train from each other in a vehicle front-rear direction; and
a cowl panel provided above the dash panel and extending in a vehicle width direction,
the dash panel including a bulge portion bulging from a center portion of the dash panel in the vehicle width direction toward a rear of the vehicle,
a portion of the bulge portion between front portions of a left wall portion and a right wall portion in the vehicle width direction being open forward,
the dash panel including a reinforcement disposed between the left wall portion and the right wall portion, the reinforcement being forward of a rear end wall portion of the bulge portion at a rear end portion of the vehicle,
the rear end wall portion of the bulge portion being positioned at a rear of a rear end portion at a center portion of the cowl panel in the vehicle width direction,
the reinforcement having a plate shape extending in an up-down direction and in the vehicle width direction,
a left end portion of the reinforcement in the vehicle width direction being fixed to an inner surface of the left wall portion of the bulge portion,
a right end portion of the reinforcement in the vehicle width direction being fixed to an inner surface of the right wall portion of the bulge portion,
the reinforcement having a deformation inducing portion inducing bending deformation of the reinforcement in response to a rearward load of the power train when the power train moves rearward upon a collision.

2. The vehicle body structure of claim 1, further comprising:
a pair of right and left hinge pillars arranged so as to extend in an up-down direction at both end portions of the dash panel in the vehicle width direction; and an instrument panel member fixed to at least one of the hinge pillars and extending to at least a center portion in the vehicle width direction, wherein
an upper wall portion of the bulge portion is at a position lower than a lower end portion of the instrument panel member.

3. The vehicle body structure of claim 2, wherein
the rear end wall portion of the bulge portion is positioned at a rear of a front end portion of the instrument panel member.

4. The vehicle body structure of claim 3, wherein
a fixing portion to be fixed to an inner surface of the bulge portion is provided at the reinforcement,
a cutout portion opening forward is formed at the fixing portion, and
the fixing portion is fastened and fixed to the bulge portion by a fastening member inserted into the cutout portion.

5. The vehicle body structure of claim 2, wherein
a fixing portion to be fixed to an inner surface of the bulge portion is provided at the reinforcement,
a cutout portion opening forward is formed at the fixing portion, and
the fixing portion is fastened and fixed to the bulge portion by a fastening member inserted into the cutout portion.

6. The vehicle body structure of claim 1, wherein
the deformation inducing portion includes at least one of a through-hole penetrating the reinforcement or a deformed portion formed by deformation of the reinforcement into a bead shape.

7. The vehicle body structure of claim 1, wherein
a fixing portion to be fixed to an inner surface of the bulge portion is provided at the reinforcement,
a cutout portion opening forward is formed at the fixing portion, and
the fixing portion is fastened and fixed to the bulge portion by a fastening member inserted into the cutout portion.

* * * * *